United States Patent
Kim et al.

(10) Patent No.: US 11,767,420 B2
(45) Date of Patent: Sep. 26, 2023

(54) PLASTICIZER COMPOSITION AND RESIN COMPOSITION INCLUDING THE SAME

(71) Applicant: LG CHEM, LTD., Seoul (KR)

(72) Inventors: Hyun Kyu Kim, Daejeon (KR); Yun Ki Cho, Daejeon (KR); Jeong Ju Moon, Daejeon (KR); Joo Ho Kim, Daejeon (KR); Seok Ho Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 22 days.

(21) Appl. No.: 16/642,648

(22) PCT Filed: Nov. 1, 2018

(86) PCT No.: PCT/KR2018/013186
§ 371 (c)(1),
(2) Date: Feb. 27, 2020

(87) PCT Pub. No.: WO2019/088736
PCT Pub. Date: May 9, 2019

(65) Prior Publication Data
US 2021/0155788 A1    May 27, 2021

(30) Foreign Application Priority Data

Nov. 1, 2017   (KR) .................. 10-2017-0144959

(51) Int. Cl.
*C08L 27/06*   (2006.01)
*C08K 5/00*    (2006.01)
*C08K 5/12*    (2006.01)

(52) U.S. Cl.
CPC ............ *C08L 27/06* (2013.01); *C08K 5/0016* (2013.01); *C08K 5/12* (2013.01); *C08K 2201/014* (2013.01)

(58) Field of Classification Search
CPC ......... C08L 27/06; C08K 5/0016; C08K 5/12; C08K 5/11; C08K 2201/014
See application file for complete search history.

(56) References Cited

U.S. PATENT DOCUMENTS

| | | | |
|---|---|---|---|
| 7,297,738 B2 * | 11/2007 | Gosse | C08K 5/12 524/285 |
| 2010/0298477 A1 * | 11/2010 | Godwin | C08L 27/06 524/285 |
| 2015/0232411 A1 * | 8/2015 | Storzum | C07C 69/82 524/297 |
| 2017/0015810 A1 | 1/2017 | Miyazaki et al. | |
| 2017/0233548 A1 | 8/2017 | Pfeiffer et al. | |
| 2017/0313848 A1 | 11/2017 | Pfeiffer et al. | |
| 2018/0100052 A1 | 4/2018 | Kim et al. | |
| 2018/0163018 A1 * | 6/2018 | Kim | C07C 67/62 |

FOREIGN PATENT DOCUMENTS

| | | | |
|---|---|---|---|
| CN | 101990560 A | 3/2011 | |
| CN | 103205067 A | 7/2013 | |
| CN | 105542352 A | 5/2016 | |
| CN | 106604957 A | 4/2017 | |
| EP | 3124540 A1 | 2/2017 | |
| JP | 2013147519 A | 8/2013 | |
| JP | 2013147520 A | 8/2013 | |
| JP | 5673569 B2 | 2/2015 | |
| JP | 2016074876 A | 5/2016 | |
| JP | 2017082135 A | 5/2017 | |
| KR | 10-20090038514 A | 4/2009 | |
| KR | 10-20170049447 A | 5/2017 | |
| KR | 10-2017-0066548 A | 6/2017 | |
| TW | 201542639 A | 11/2015 | |
| WO | WO 2017183877 A1 * | 10/2017 | ............... C08K 5/10 |

OTHER PUBLICATIONS

Machine translation of JP 2013147519 A, to Kikuchi et al., published Aug. 1, 2013 (Year: 2013).*
Extended European Search Report issued in related European Application No. 18872532.9 dated Nov. 19, 2020.

* cited by examiner

*Primary Examiner* — Jane L Stanley
(74) *Attorney, Agent, or Firm* — Morgan, Lewis & Bockius LLP

(57) ABSTRACT

A plasticizer composition and a resin composition including the plasticizer composition. The resin composition addresses limitations associated with conventional plasticizers by improving various properties such as plasticization efficiency and mechanical properties including migration properties, volatile loss, tensile strength and elongation rate. The plasticizer composition is also capable of improving properties such as elongation retention and cold tolerance.

17 Claims, No Drawings

PLASTICIZER COMPOSITION AND RESIN COMPOSITION INCLUDING THE SAME

CROSS-REFERENCE TO RELATED APPLICATIONS

The present application is the U.S. national stage of international Application No. PCT/KR2018/013186, filed Nov. 1, 2018, and claims the benefit of priority based on Korean Patent Application No. 10-2017-0144959, filed on Nov. 1, 2017, the entire contents of which are incorporated herein by reference.

TECHNICAL FIELD

The present invention relates to a plasticizer composition and a resin composition including the same.

BACKGROUND

Generally, plasticizers are obtained by reacting an alcohol with a polycarboxylic acid such as phthalic acid and adipic acid and forming a corresponding ester. Considering internal and external regulation on a phthalate-based plasticizer which is harmful to the human body, studies on plasticizer compositions which may replace the phthalate-based plasticizer such as terephthalate-based, adipate-based and other polymer-based plasticizers are being continued.

Meanwhile, in a compound industry of which main demanding properties include high heat resistance and low volatile loss, appropriate plasticizers are required to be used considering the demanding properties. In case of PVC compounds for the purpose of wirings and cables, an additive such as a plasticizer, a stabilizer and a pigment is mixed with a PVC resin according to the properties required in corresponding regulations such as tensile strength, elongation rate, plasticization efficiency, volatile loss, and tensile and elongation rate retention.

Currently, diisodecyl phthalate (DIDP) which is typically used in industries for wiring compounds and car materials, is a material observed for environmental hormones and its use is regulated depending on environmental issues. Accordingly, the requirement on the development of eco-friendly products which may replace the DIDP is increasing.

Therefore, studies on securing a vinyl chloride-based resin composition which is free of environmental issues and having excellent quality by developing a product having better physical properties than diisodecyl phthalate (DIDP) using an eco-friendly novel plasticizer composition, is being conducted.

SUMMARY

The present invention provides a plasticizer which is applied to a resin composition and has improved physical properties such as plasticization efficiency, tensile retention, elongation retention, migration resistance, volatile loss, and cold tolerance, and a resin composition including the same.

To solve the above-described tasks, according to an embodiment of the present invention, there is provided a plasticizer composition including a cyclohexane 1,4-diester-based material including one or more cyclohexane 1,4-diesters wherein carbon numbers of two alkyl groups combined with a diester group are each independently 8 to 12; and a trimellitate-based material including a compound represented by the following Formula 1:

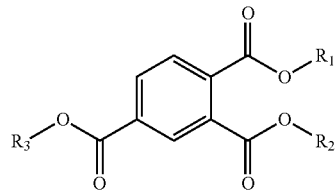

[Formula 1]

In Formula 1, $R_1$ to $R_3$ are each independently an alkyl group of 8 to 12 carbon atoms.

To solve the above-described tasks, according to an embodiment of the present invention, there is provided a resin composition including 100 parts by weight of a resin; and 5 to 150 parts by weight of the aforementioned plasticizer composition.

The plasticizer composition according to an embodiment of the present invention, if used in a resin composition, may provide excellent physical properties such as tensile and elongation retention, cold tolerance, migration properties and volatile loss as well as excellent plasticization efficiency, tensile strength and elongation rate.

DETAILED DESCRIPTION

Definition of Terms

The term "composition" used in the description includes a reaction product and a decomposition product which are produced from raw materials, and a mixture thereof.

The prefix "iso-" used in the description means an alkyl group in which a methyl group with 1 carbon atom is combined with the main chain of the alkyl group as a branch chain, and generally means an alkyl group combined with a methyl branch at the terminal thereof. In the present description, "iso-" may be the generic term of an alkyl group in which a methyl group is combined as a branch chain with a main chain including a terminal, unless otherwise specified.

The term "isononyl" used in the description may mean an alkyl group of total 9 carbon atoms, in which one or more among one or two methyl groups, one ethyl group and one propyl group are substituted for a main chain as branch chains, and may be used as the generic term of, for example, a 2-methyloctyl group, a 3-methyloctyl group, a 4-methyloctyl group, a 5-methyloctyl group, a 6-methyloctyl group, a 3-ethylheptyl group, a 2-ethylheptyl group, a 2,5-dimethylheptyl group, a 2,3-dimethylheptyl group, a 4,5-dimethylheptyl group, a 3-ethyl-4-methylhexyl group, a 2-ethyl-4-methylhexyl group, or a 2-propylhexyl group. Commercially used isononyl alcohol (CAS No.: 68526-84-1, 27458-94-2) may mean a composition of isomers having the degree of branch of 1.2-1.9, and the commercial alcohol may partially include a n-nonyl group.

The term "straight vinyl chloride polymer" used in the description may mean a kind of a vinyl chloride polymer which is polymerized by suspension polymerization or bulk polymerization and means a polymer having a porous particle shape with a large number of distributed pores, a size of the particle in the range of tens to hundreds micrometer, no cohesion, and excellent flowability.

The term "paste vinyl chloride polymer" used in the description may mean a kind of a vinyl chloride polymer which is polymerized by microsuspension polymerization, micro-seeded polymerization or emulsion polymerization and means a polymer having particles having a tens to thousands nanometer size without minute and dense pores, cohesion, and inferior flowability.

The terms "comprise", "comprising" and the derivatives thereof, whether particularly disclosed or not, do not intend to preclude the addition or presence of optional components, steps or operations. In order to avoid any doubtfulness, all claimed compositions via the term "comprise" may include optional additional additives, auxiliaries or compounds irrespective of types including polymers, unless otherwise described. On the contrary, the term "consisting essentially of" excludes an element which is not essential for operation and precludes optional other components, steps or operations from the scope of optional continuous explanation. The term "consisting of" precludes optional components, steps or operations, which are not particularly described or listed.

Measurement Method

In the present description, the analysis of the contents of the components in a composition is performed by gas chromatography measurement using a gas chromatography instrument of Agilent Co. (product name: Agilent 7890 GC, column: HP-5, carrier gas: helium (flow rate 2.4 ml/min), detector: F.I.D, injection volume: 1 μl, initial value: 70° C./4.2 min, terminal value: 280° C./7.8 min, program rate: 15° C./min).

In the description, "hardness" means shore hardness (Shore "A" and/or Shore "D") at 25° C., measured under conditions of 3T 10s by using ASTM D2240, and may be an index for evaluating plasticization efficiency. The lower the hardness is, the better the plasticization efficiency is.

In the description, "tensile strength" is measured according to ASTM D638. After pulling at a cross head speed of 200 mm/min (1T) by using a test instrument of U.T.M (manufacturer; Instron, model name; 4466), a position where a specimen is cut is measured, and the tensile strength is calculated by Mathematical Formula 1 below.

Tensile strength (kgf/cm²)=load value (kgf)/thickness (cm)×width (cm)     [Mathematical Formula 1]

In the description, "elongation rate" is measured according to ASTM D638. After pulling at a cross head speed of 200 mm/min (1T) by using the U.T.M, a position where a specimen is cut is measured, and the elongation rate is calculated by Mathematical Formula 2 below.

Elongation rate (%)=[length after elongation/initial length]×100     [Mathematical Formula 2]

In the description, "migration loss" is measured according to KSM-3156. A specimen with a thickness of 2 mm or more is obtained, and glass plates are attached on both sides of the specimen and a load of 2 kgf/cm² is applied. The specimen is stood in a hot air circulation oven (80° C.) for 72 hours and is taken out and cooled at room temperature for 4 hours. After that, the glass plates attached to both sides of the specimen are removed, and the weights before and after the standing the glass plates and the specimen plate in the oven are measured. The migration loss is calculated by Mathematical Formula 3 below.

Migration loss (%)=[(initial weight of specimen at room temperature−weight of specimen after standing in oven)/initial weight of specimen at room temperature]×100     [Mathematical Formula 3]

In the description, "volatile loss" is obtained by working the specimen at 80° C. for 72 hours, and measuring the weight of the specimen.

Volatile loss (wt %)=[(weight of initial specimen− weight of specimen after working)/weight of initial specimen]×100     [Mathematical Formula 4]

The condition details such as temperature, rotation velocity, and time among various measurement conditions may be somewhat changed by cases, and in case of different conditions, the measurement method and the conditions thereof will be described.

Hereinafter, the present invention will be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in technical idea of the invention, based on the principle that an inventor may properly define the meaning of the words or terms to best explain the invention.

Plasticizer Composition Including Two or Three Kinds of Plasticizers

According to an embodiment of the present invention, a plasticizer composition includes two or more kinds of plasticizers, and the two or more kinds of the plasticizers essentially include a cyclohexane 1,4-diester-based material including one or more cyclohexane 1,4-diesters wherein carbon numbers of two alkyl groups combined with a diester group are each independently 8 to 12; and a trimellitate-based material including a compound represented by the following Formula 1:

[Formula 1]

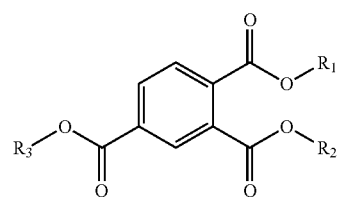

In Formula 1, $R_1$ to $R_3$ are each independently an alkyl group of 8 to 12 carbon atoms.

In addition, if the cyclohexane 1,4-diester-based material and the trimellitate-based material are included, the weight ratio of the two materials may be 99:1, 95:5, 90:10, 85:15, 80:20, 70:30 or 60:40, which is an upper limit, and 1:99, 5:95, 10:90, 15:85, 20:80, 30:70 or 40:60, which is a lower limit, and 90:10 to 10:90 or 80:20 to 10:90, more preferably, 80:20 to 20:80. If the preferable range is satisfied, more improved migration properties and volatile loss properties may be shown.

The plasticizer composition may include three kinds of plasticizers, and in this case, an epoxidized oil may be further included.

If the plasticizer composition is composed of three kinds of plasticizers, the same weight ratio as the weight ratio in a case where two kinds including the cyclohexane 1,4-diester-based material and the trimellitate-based material are selected, may be applied. As the weight ratio of the epoxidized oil with respect to the total weight of the cyclohexane 1,4-diester-based material and the trimellitate-based material, the weight ratio of the total weight of mixture of the two kinds with respect to the epoxidized oil may be 90:10 to 10:90, preferably, 90:10 to 50:50, more preferably, 80:20 to 50:50.

Cyclohexane 1,4-diester-Based Material

In a cyclohexane 1,4-diester included in the cyclohexane 1,4-diester-based material according to an embodiment of the present invention, each carbon number of two alkyl groups combined with a diester group may be 8 to 12, preferably, 8 to 11, or 8 to 10. The cyclohexane 1,4-diester-based material is the hydrogenated material of a terephthalate-based material and is the most useful plasticizer which may replace a phthalate-based plasticizer. When compared with the conventional phthalate-based plasticizer, the cyclohexane 1,4-diester-based material may show equivalent basic mechanical properties, may be applicable as an eco-friendly plasticizer and may have remarkably improved plasticization efficiency.

In addition, two alkyl groups combined with the diester group of the cyclohexane 1,4-diester-based material may be, for example, a 2-ethylhexyl group, an isononyl group, a 2-propylheptyl group, an isodecyl group, an undecyl group or a dodecyl group, preferably, a 2-ethylhexyl group, an isononyl group, a 2-propylheptyl group or an isodecyl group.

Particularly, in case of a single compound, the cyclohexane 1,4-diester may be selected from the group consisting of diisononyl cyclohexane 1,4-diester (1,4-DINCH), di(2-ethylhexyl) cyclohexane 1,4-diester (1,4-DEHCH), di(2-propylheptyl) cyclohexane 1,4-diester (1,4-DPHCH) and diisodecyl cyclohexane 1,4-diester (1,4-DIDCH), preferably, di(2-ethylhexyl) cyclohexane 1,4-diester, diisononyl cyclohexane 1,4-diester, or di(2-propylheptyl) cyclohexane 1,4-diester.

In addition, in case of a mixture, the cyclohexane 1,4-diester-based material may be a mixture of three kinds of cyclohexane 1,4-diester-based materials, and at least one kind in which the carbon numbers of the alkyl groups combined with the diester are 8 to 12 may be included among the three kinds. Additionally, two kinds of cyclohexane 1,4-diesters may be further included. In this case, in the additionally included cyclohexane 1,4-diester, the carbon numbers of the alkyl groups combined with the diester group may be 4 to 12, but this carbon number is only limited to the alkyl group of the cyclohexane 1,4-diester which is additionally applied in case of forming the mixture of three kinds.

For example, the mixture may be a first mixture obtained by mixing di(2-ethylhexyl) cyclohexane 1,4-diester, butyl (2-ethylhexyl) cyclohexane 1,4-diester and dibutyl cyclohexane 1,4-diester, a second mixture obtained by mixing diisononyl cyclohexane 1,4-diester, butylisononyl cyclohexane 1,4-diester and dibutyl cyclohexane 1,4-diester, or a third mixture obtained by mixing bis(2-ethylhexyl) cyclohexane-1,4-diester, (2-ethylhexyl)isononyl cyclohexane 1,4-diester and diisononyl cyclohexane 1,4-diester, and besides the mixtures, diverse mixtures may be formed according to the combination of two alkyl groups among the alkyl groups which are capable of being combined with the diester group.

Particularly, the first to third mixtures may have specific composition ratios. The first mixture may include 3.0 to 99.0 mol % of di(2-ethylhexyl) cyclohexane 1,4-diester; 0.5 to 96.5 mol % of butyl(2-ethylhexyl) cyclohexane 1,4-diester and 0.5 to 96.5 mol % of dibutyl cyclohexane 1,4-diester, the second mixture may include 3.0 to 99.0 mol % of diisononyl cyclohexane 1,4-diester; 0.5 to 96.5 mol % of butylisononyl cyclohexane 1,4-diester and 0.5 to 96.5 mol % of dibutyl cyclohexane 1,4-diester, and the third mixture may include 3.0 to 99.0 mol % of di(2-ethylhexyl) cyclohexane 1,4-diester; 0.5 to 96.5 mol % of (2-ethylhexyl)isononyl cyclohexane 1,4-diester and 0.5 to 96.5 mol % of diisononyl cyclohexane-1,4-diester.

The composition ratio may be a mixture composition ratio obtained by esterification reaction, or may be an intended composition ratio by additionally mixing a specific compound, and the mixture composition ratio may be appropriately controlled to satisfy desired physical properties.

Regarding a preparation method, the cyclohexane 1,4-diester-based material may be prepared by the direct esterification reaction of 1,4-cyclohexane dicarboxylic acid and one or more alcohols, or the transesterification reaction of dialkyl cyclohexane 1,4-diester (or dialkyl 1,4-cyclohexanoate) and an alcohol.

Alternatively, the cyclohexane 1,4-diester-based material may be prepared by the hydrogenation reaction of a dialkyl terephthalate which is prepared via the esterification reaction of a terephthalic acid raw material, and any preparation method which may prepare the cyclohexane 1,4-diester-based material as the hydrogenated material of a terephthalate-based material may be applied, without specific limitation.

The alcohol may be a primary alcohol and an alkyl group may be selected from the group consisting of a 2-ethylhexyl group, an isononyl group, a 2-propylheptyl group, an isodecyl group, an undecyl group and a dodecyl group. One kind of the alcohol may be applied for the direct esterification reaction and a single terephthalate may be applied, or two or more mixture alcohols may be applied to the direct esterification reaction or transesterification reaction and a mixture of two or more terephthalates may be applied.

Particularly, if the transesterification reaction is performed and the mixed cyclohexane 1,4-diester-based material is applied, the mixed cyclohexane 1,4-diester-based material may have specific composition ratio in each mixture, including 3.0 to 99.0 mol % of di(alkyl A) cyclohexane 1,4-diester; 0.5 to 96.5 mol % of (alkyl A) (alkyl B) cyclohexane 1,4-diester and 0.5 to 96.5 mol % of di(alkyl B) cyclohexane 1,4-diester. The alkyl A may be derived from the cyclohexane 1,4-diester among the reactants and the alkyl B may be derived from an alcohol.

The composition ratio may be a mixture composition ratio produced by esterification reaction, and may be an intended composition ratio by additionally mixing a specific compound. The mixture composition ratio may be appropriately controlled according to desired physical properties.

As described above, if 1,4-cyclohexanate in which the carbon numbers of the alkyls of a diester group are 8 to 12, is used as a plasticizer, the balance among mechanical properties and properties of plasticization efficiency, migration properties and volatile loss may be achieved by the control of appropriate carbon number.

Trimellitate-Based Material

According to an embodiment of the present invention, the plasticizer composition may include a trimellitate-based material, and this trimellitate-based material may be represented by Formula 1 below.

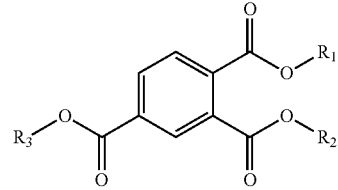

[Formula 1]

In Formula 1, $R_1$ to $R_3$ are each independently an alkyl group of 8 to 12 carbon atoms.

The trimellitate-based material is a material which may compensate the above-described cyclohexane 1,4-diester-based material and may compensate migration resistance or loss properties, which are effects not achieved by the cyclohexane 1,4-diester-based material when compared with a phthalate-based plasticizer.

In the trimellitate-based material, $R_1$ to $R_3$ of Formula 1 may have 8 to 12 carbon numbers and may be the same from each other. If $R_1$ to $R_3$ are different, two among $R_1$ to $R_3$ may be the same alkyl group and the remaining one may be a different alkyl group. For example, the alkyl group may be selected from an octyl group, a 2-ethylhexyl group, an isononyl group, a 2-propylheptyl group, an isodecyl group, an undecyl group and a dodecyl group. That is, the alkyl group of $R_1$ to $R_3$ of Formula 1 may be selected from the same range as the alkyl group of the cyclohexane 1,4-diester-based material.

In addition, in the trimellitate-based material, the control of the carbon number may be particularly more important. Since the number of ester groups combined with a benzene ring is three, the structure or molecular weight of a trimellitate molecule itself may be largely affected by the alkyl group applied, and appropriate selection of the alkyl group is required.

In addition, the trimellitate material may be the most optimal material which is capable of being mixed with the cyclohexane 1,4-diester-based material into a plasticizer composition, and may show specific effects in improving migration properties, volatile loss, elongation rate, elongation retention, and further tensile retention, when compared with the conventional products.

Epoxidized Oil

According to an embodiment of the present invention, the plasticizer composition includes the cyclohexane 1,4-diester-based material and the trimellitate-based material and may further include as a third mixing material, epoxidized oil.

The epoxidized oil, for example, epoxidized soybean oil, epoxidized castor oil, epoxidized linseed oil, epoxidized palm oil, epoxidized stearate, epoxidized oleate, epoxidized tall oil, epoxidized linoleate, or a mixture thereof, may be applied.

Preferably, the epoxidized soybean oil (ESO), the epoxidized linseed oil (ELO) or a mixture thereof may be applied as the epoxidized oil. However, the epoxidized soybean oil may be more frequently used than the epoxidized linseed oil due to the market situation or supply and demand problem.

In the plasticizer composition according to an embodiment of the present invention, the epoxidized oil may be included in an appropriate weight ratio with respect to the mixture weight of the cyclohexane 1,4-diester-based material and the trimellitate material, as described above.

If the epoxidized oil is included, the weights of the cyclohexane 1,4-diester-based material and the trimellitate-based material are relatively decreased, but no degradation of physical properties due to the decrease is shown. Rather, the physical properties may be improved and also, the unit cost of goods may be secured.

Preparation Method

A blending method may be applied as the method for preparing the plasticizer composition in the present invention, and a composition may be prepared by preparing each of a cyclohexane 1,4-diester-based material, an epoxidized oil and a trimellitate-based material, and then mixing.

If the cyclohexane 1,4-diester-based material is prepared by direct esterification of cyclohexane 1,4-dicarboxylic acid and an alcohol, one or more alcohols such as 2-ethylhexyl alcohol, isononyl alcohol, and 2-propylheptyl alcohol, which include an alkyl group combined with the diester group of the cyclohexane 1,4-diester-based material, may be applied to perform reaction with cyclohexane 1,4-dicarboxylic acid.

The direct esterification reaction may be performed by a step of injecting cyclohexane 1,4-dicarboxylic acid to an alcohol, adding a catalyst and reacting under a nitrogen atmosphere; a step of removing unreacted alcohol, and neutralizing unreacted acid; and a step of dehydrating by distillation under a reduced pressure and filtering.

In addition, the alcohol may be used in a range of 150 to 500 mol %, 200 to 400 mol %, 200 to 350 mol %, 250 to 400 mol %, or 270 to 330 mol % based on 100 mol % of the cyclohexane 1,4-dicarboxylic acid.

Meanwhile, the catalyst of the esterification reaction may be, for example, one or more selected from an acid catalyst such as sulfuric acid, hydrochloric acid, phosphoric acid, nitric acid, paratoluenesulfonic acid, methanesulfonic acid, ethanesulfonic acid, propanesulfonic acid, butanesulfonic acid, and alkyl sulfate, a metal salt such as aluminum lactate, lithium fluoride, potassium chloride, cesium chloride, calcium chloride, potassium chloride, iron chloride, and aluminum phosphate, a metal oxide such as heteropoly acid, natural/synthetic zeolites, cation and anion exchange resins, and an organometal such as tetraalkyl titanate and the polymer thereof. In a particular embodiment, the catalyst may use tetraalkyl titanate.

The amount used of the catalyst may be different according to the kind. For example, a homogeneous catalyst may be used in an amount range of 0.01 to 5 wt %, 0.01 to 3 wt %, 1 to 5 wt % or 2 to 4 wt % with respect to total 100 wt % of the reactants, and a heterogeneous catalyst may be used in an amount range of 5 to 200 wt %, 5 to 100 wt %, 20 to 200 wt % or 20 to 150 wt % of the total amount of the reactants.

In this case, the reaction temperature may be in a range of 180 to 280° C., 200 to 250° C., or 210 to 230° C.

If the cyclohexane 1,4-diester-based material is prepared as a mixture, cyclohexane 1,4-diester may be prepared by above-described direct esterification reaction and then mixed, or a method of applying two or more alcohols in the direct esterification reaction may be applied. Alternatively, the cyclohexane 1,4-diester may be prepared via transesterification reaction by which a cyclohexane 1,4-diester such as di(2-ethylhexyl) 1,4-cyclohexanoate and diisononyl 1,4-cyclohexanoate, and an alcohol such as 2-propylheptyl alcohol, isodecyl alcohol and undecyl alcohol are reacted.

The "transesterification reaction" used in the description means reaction of an alcohol with an ester as shown in Reaction 1 below to interchange R" of ester with R' of alcohol, as shown in Reaction 1 below.

[Reaction 1]

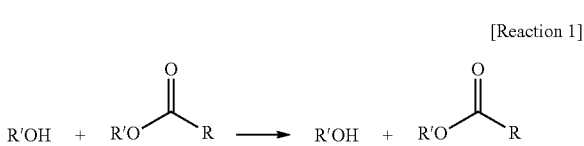

According to an embodiment of the present invention, if the transesterification reaction is carried out, a compositions of three kinds of ester may be produced according to three cases: a case where the alkoxide of an alcohol attacks the carbon of two ester groups (RCOOR") present in an ester-based compound; a case where the alkoxide attacks the carbon of one ester group (RCOOR") present in an ester-based compound; and a case of unreacting by which no reaction is carried out.

In addition, the transesterification reaction is advantageous in not generating waste water when compared with esterification reaction between acid-alcohol.

For example, by the transesterification reaction of di(2-ethylhexyl) 1,4-cyclohexanoate and isononyl alcohol, a mixture of di(2-ethylhexyl) 1,4-cyclohexanoate, (2-ethylhexyl) isononyl 1,4-cyclohexanoate and diisononyl 1,4-cyclohexanoate may be produced, and the three kinds of cyclohexane 1,4-diester-based materials may be respectively formed in an amount of 0.5 wt % to 80 wt %, 0.5 wt % to 80 wt %, and 0.5 wt % to 85 wt %, particularly, 1 wt % to 50 wt %, 1 wt % to 50 wt %, and 10 wt % to 80 wt % with respect to the total weight of the mixture.

In addition, the composition ratio of the mixture prepared by the transesterification reaction may be controlled by the addition amount of the alcohol.

The amount added of the alcohol may be 0.1 to 89.9 parts by weight, particularly, 3 to 50 parts by weight, more particularly, 5 to 40 parts by weight with respect to 100 parts by weight of the cyclohexane 1,4-diester.

In the cyclohexane 1,4-diester-based material, if the amount added of the alcohol increases, the mole fraction of the cyclohexane 1,4-diester participating the transesterification reaction may increase, and the amount of two cyclohexane 1,4-diester products may increase in the mixture. Accordingly, the amount of cyclohexane 1,4-diester present as an unreacted material may tend to decrease.

According to an embodiment of the present invention, the molar ratio of the cyclohexane 1,4-diester and the alcohol reactants may be, for example, 1:0.005 to 5.0, 1:0.05 to 2.5, or 1:0.1 to 1.0, and within this range, process efficiency may be high and effects of obtaining a plasticizer composition with excellent processability improving effect may be attained.

However, the composition ratios of the mixture of the three kinds of the cyclohexane 1,4-diester-based materials are not limited to the ranges, and the composition ratio may be changed by additionally injecting any one among the three kinds of the cyclohexane 1,4-diesters, and possible mixture composition ratios are as described above.

According to an embodiment of the present invention, the transesterification reaction may be performed at a temperature of 120 to 190° C., preferably, 135 to 180° C., more preferably, 141 to 179° C. for 10 minutes to 10 hours, preferably, 30 minutes to 8 hours, more preferably, 1 to 6 hours. Within the temperature and time ranges, a mixture of cyclohexane 1,4-diester-based materials with a desired composition ratio may be effectively obtained. In this case, the reaction time may be calculated from a point when the temperature of the reactants is elevated and arrived at the reaction temperature.

The transesterification reaction may be performed under an acid catalyst or a metal catalyst, and in this case, effects of decreasing the reaction time may be achieved.

The acid catalyst may be, for example, sulfuric acid, methanesulfonic acid or p-toluenesulfonic acid, and the metal catalyst may be, for example, an organometal catalyst, a metal oxide catalyst, a metal salt catalyst or a metal itself.

The metal component may be, for example, any one selected from the group consisting of tin, titanium and zirconium, or a mixture of two or more thereof.

Also, as a different method in preparing the plasticizer composition, a method of preparing the cyclohexane 1,4-diester-based material by performing direct esterification reaction or transesterification reaction using terephthalic acid or terephthalate as a raw material, and then hydrogenation reaction, may be applied.

The hydrogenation reaction may be a step of transforming a terephthalate-based material into a cyclohexane 1,4-diester-based material via the hydrogenation reaction of a terephthalate-based material which is a single compound or a mixture compound, in the presence of a metal catalyst.

The hydrogenation reaction is reaction for removing the aromaticity of the benzene ring of a terephthalate-based material by adding hydrogen in the presence of a metal catalyst, and may be a kind of reduction reaction.

The hydrogenation reaction is for synthesizing a cyclohexane 1,4-diester-based material by reacting the terephthalate-based material with hydrogen under a metal catalyst, and the reaction conditions may include common reaction conditions for hydrogenating only a benzene ring without influencing a carbonyl group which is substituted in benzene.

The hydrogenation reaction may be performed by further including an organic solvent such as ethanol, without limitation. As the metal catalyst, a Rh/C catalyst, a Pt catalyst, a Pd catalyst, etc., which are commonly used for hydrogenating a benzene ring, may be used, but any one capable of performing the hydrogenation reaction described above may be used, without limitation.

The direct esterification reaction and the transesterification reaction may be used for preparing the above-described trimellitate-based material (using trimellitic acid instead of terephthalic acid). In this case, the trimellitate-based material may be prepared as a mixture with a predetermined ratio as the cyclohexane 1,4-diester-based material, and the composition ratio of a mixture produced may be controlled by controlling the amount of an alcohol as a reaction raw material. Besides, if the trimellitate-based material is prepared by direct esterification reaction or transesterification reaction, the same description as the description applied for preparing the cyclohexane 1,4-diester-based material may be applied except for the hydrogenation reaction.

In addition, for the reaction materials, acid anhydrides may be used as an alternative material instead of carboxylic acid materials such as cyclohexane 1,4-dicarboxylic acid, terephthalic acid, citric acid and trimellitic acid.

The plasticizer composition thus prepared may be included in a range of 5 to 150 parts by weight, 10 to 100 parts by weight, or 10 to 60 parts by weight with respect to 100 parts by weight of a resin selected from ethylene vinyl acetate, polyethylene, polypropylene, polyketone, polyvinyl chloride, polystyrene, polyurethane and thermoplastic elastomer, to provide a resin composition which is effective for extrusion, injection, calendaring and compounding treatment.

Particularly, if the polyvinyl chloride resin is applied as the resin, both a straight vinyl chloride polymer which is applied to extrusion, injection, calendaring and compounding treatment, and a paste vinyl chloride polymer which is applied to plastisol treatment may be applied. The plasticizer composition according to the present invention may preferable be the plasticizer of the straight vinyl chloride polymer.

In an embodiment, the plasticizer composition may be applied for the manufacture of wirings, flooring materials, car interior materials, films, sheets, wall papers or tubes.

EXAMPLES

Hereinafter, the present invention will be explained in more detail referring to embodiments. Embodiments according to the present invention may be modified into various other types, and the scope of the present invention should not be limited to the embodiments described below. The embodiments of the present invention are provided for completely explaining the present invention to a person having an average knowledge in the art.

1. Preparation of Plasticizer Composition

Preparation Example 1: Preparation of di(2-ethylhexyl) cyclohexane-1,4-diester

To a four-neck, 3 liter reactor equipped with a cooler, a condenser, a decanter, a reflux pump, a temperature controller, and a stirrer, 516.0 g of 1,4-cyclohexane dicarboxylic acid (CHDA), 1170 g of 2-ethylhexyl alcohol (2-EH), (molar ratio of CHDA:2-EH (1.0):(3.0)), and 1.55 g (0.3 parts by weight with respect to 100 parts by weight of CHDA) of a titanium-based catalyst (TIPT, tetraisopropyl titanate) as a catalyst were injected, followed by gradually elevating the temperature to about 170° C. Around 170° C., water generation was initiated, and esterification reaction was performed for about 4.5 hours while continuously injecting nitrogen gas under the reaction temperature of about 220° C. and the atmospheric pressure. The reaction was finished if an acid value reached 0.1.

After finishing the reaction, distillation extraction was performed for 0.5 to 4 hours under a reduced pressure to remove unreacted raw materials. Steam distillation was performed using steam under a reduced pressure for 0.5 to 3 hours to remove unreacted raw materials to a certain amount degree or less, the reaction product was cooled to about 90° C., and neutralization treatment was performed using an alkaline solution. Additionally, washing might be performed and then, the reaction product was dehydrated to remove water. To the dehydrated reaction solution, remaining materials were injected, stirring was performed for a certain time, and filtering was performed to finally obtain 1167 g (yield: 98.0%) of di(2-ethylhexyl) 1,4-cyclohexanoate.

Preparation Example 2: Preparation of diisononyl cyclohexane-1,4-diester

The same reaction method as Preparation Example 1 was performed except for using isononyl alcohol instead of 2-ethylhexyl alcohol in Preparation Example 1 during performing esterification reaction to obtain a hydrogenated material.

Preparation Example 3: Preparation of di(2-propylheptyl) cyclohexane-1,4-diester The same reaction method as Preparation Example 1 was performed except for using 2-propylheptyl alcohol instead of 2-ethylhexyl alcohol in Preparation Example 1 during performing esterification reaction to obtain a hydrogenated material.

Preparation Example 4: Preparation of Hydrogenated Mixture of DEHCH/EHINCH/DINCH To a reactor equipped with a stirrer, a condenser and a decanter, 2000 g of di(2-ethylhexyl) 1,4-cyclohexanoate and 400 g (22 parts by weight based on 100 parts by weight of di(2-ethylhexyl) 1,4-cyclohexanoate) of isononyl alcohol were injected, and transesterification reaction was performed under a nitrogen atmosphere at the reaction temperature of 160° C. for 2 hours to produce a plasticizer composition including di(2-ethylhexyl) 1,4-cyclohexanoate (1,4-DEHCH), octylisononyl 1,4-cyclohexanoate (1,4-EHINCH) and diisononyl 1,4-cyclohexanoate (1,4-DINCH) in an amount of 48 wt %, 42 wt % and 10 wt %, respectively.

The reaction product was distilled to remove isononyl alcohol and 2-ethylhexyl alcohol to finally obtain a mixture composition.

Preparation Example 5: Preparation of tri(2-ethylhexyl) trimellitate

By using 576.3 g of trimellitic acid and 1,755 g of 2-ethylhexyl alcohol as reaction raw materials, 1,606 g (yield: 98%) of a tri(2-ethylhexyl) trimellitate product was finally obtained.

Preparation Example 6: Preparation of triisononyl trimellitate

By using 576.3 g of trimellitic acid and 1,948 g of isononyl alcohol as reaction raw materials, 1,731 g (yield: 98%) of a triisononyl trimellitate product was finally obtained.

2. Evaluation Items and Measurement Methods of Physical Properties of Plasticizer Measurement of Hardness Shore (shore "A") hardness at 25° C., 3T 10s was measured according to ASTM D2240.

Measurement of Tensile Strength

After pulling at a cross head speed of 200 mm/min (1T) by using a test instrument of U.T.M (manufacturer; Instron, model name; 4466), a position where a specimen was cut was measured according to ASTM D638. The tensile strength was calculated as follows.

Tensile strength (kgf/mm$^2$)=load value (kgf)/thickness (mm)×width (mm)

Measurement of Elongation Rate

After pulling at a cross head speed of 200 mm/min (1T) by using the U.T.M, a position where a specimen was cut was measured according to ASTM D638. The elongation rate was calculated as follows.

Elongation rate (%)=[length after elongation/initial length]×100

Measurement of Migration Loss

According to KSM-3156, a specimen with a thickness of 2 mm or more was obtained, and PS plates were attached to both sides of the specimen and a load of 2 kgf/cm$^2$ was applied. The specimen was stood in a hot air circulation oven (80° C.) for 72 hours and was taken out and cooled at room temperature for 4 hours. After that, the PS attached to both sides of the specimen were removed, and the weights before and after the standing in the oven were measured. The migration loss was calculated as follows.

Migration loss (%)=[(initial weight of specimen at room temperature−weight of specimen after standing in oven)/initial weight of specimen at room temperature]×100

Measurement of Volatile Loss

The specimen thus manufactured was worked at 100° C. for 168 hours, and the weight of the specimen was measured.

Volatile loss (%)=[(weight of initial specimen−weight of specimen after working)/weight of initial specimen]×100

Measurement of Tensile and Elongation Retention

The measurement of tensile and elongation retention was performed by applying heat at 100° C. for 168 hours and measuring remaining tensile and elongation rate properties of a specimen. The measurement methods are the same as those of the tensile strength and elongation rate above.

Cold Tolerance

Five specimens thus manufactured were stood at a specific temperature for 3 minutes, and struck. The temperature where three of five were broken was measured.

3. Evaluation Results of Physical Properties of Plasticizer

1) Configuration of Examples and Comparative Examples

By using the materials prepared in the Preparation Examples, Examples and Comparative Examples were configured as shown in Table 1 and Table 2 below. Among the plasticizer materials used in the Examples and the Comparative Examples, materials not described in the Preparation Examples were commercially available, and were products of LG Chem,

TABLE 1

|  | Primary plasticizers | | Primary plasticizer weight ratio |
|---|---|---|---|
| Example 1-1 | 1,4-DINCH | TEHTM | 9:1 |
| Example 1-2 | 1,4-DINCH | TEHTM | 7:3 |
| Example 1-3 | 1,4-DINCH | TEHTM | 5:5 |
| Example 1-4 | 1,4-DINCH | TEHTM | 3:7 |
| Example 1-5 | 1,4-DINCH | TEHTM | 1:9 |
| Example 1-6 | 1,4-DPHCH | TEHTM | 7:3 |
| Example 1-7 | 1,4-DPHCH | TINTM | 5:5 |
| Example 1-8 | 1,4-DEHCH | TINTM | 5:5 |
| Example 1-9 | 1,4-DEHCH | TPHTM | 3:7 |
| Example 1-10 | DEHCH/ EHINCH/ DINCH | TPHTM | 7:3 |
| Example 1-11 | DEHCH/ EHINCH/ DINCH | TEHTM | 1:9 |
| Comparative Example 1-1 | DIDP | — | — |
| Comparative Example 1-2 | DPHP | — | — |
| Comparative Example 1-3 | 1,4-DINCH | — | — |
| Comparative Example 1-4 | — | TPHTM | — |
| Comparative Example 1-5 | DEHTP | TEHTM | 7:3 |
| Comparative Example 1-6 | 1,4-DEHCH | ATEHC | 5:5 |
| Comparative Example 1-7 | 1,4-DEHCH | ESO | 5:5 |
| Comparative Example 1-8 | 1,4-DBCH | TEHTM | 5:5 |
| Comparative Example 1-9 | 1,4-DEHCH | TBTM | 5:5 |

TABLE 2

|  | Primary plasticizers | | Primary plasticizer weight ratio | Secondary plasticizer | primary:secondary weight ratio |
|---|---|---|---|---|---|
| Example 2-1 | 1,4-DEHCH | TEHTM | 2:8 | ESO | 5:5 |
| Example 2-2 | 1,4-DEHCH | TINTM | 6:4 | ESO | 7:3 |
| Example 2-3 | 1,4-DEHCH | TPHTM | 8:2 | ESO | 8:2 |
| Example 2-4 | 1,4-DEHCH | TINTM | 4:6 | ESO | 6:4 |
| Example 2-5 | 1,4-DINCH | TEHTM | 7:3 | ESO | 9:1 |
| Example 2-6 | 1,4-DPHCH | TEHTM | 5:5 | ESO | 7:3 |
| Example 2-7 | DBCH/ EHINCH/ DINCH | TEHTM | 3:7 | ESO | 9:1 |
| Comparative Example 2-1 | DIDP | — | — | — | — |
| Comparative Example 2-2 | DPHP | — | — | — | — |
| Comparative Example 2-3 | — | TEHTM | — | ESO | 5:5 |

2) Experimental Examples: Evaluation of Compound Physical Properties

Specimens were manufactured using the mixture plasticizer compositions of the Examples and the Comparative Examples shown in Table 1 and Table 2.

The specimen was manufactured referring to ASTM D638. With respect to 100 parts by weight of a polyvinyl chloride resin (PVC (LS100S)), 50 parts by weight of each of the plasticizer compositions prepared in the Examples and the Comparative Examples, and 5 parts by weight of a stabilizer, RUP-144 (Adeka Korea), 40 parts by weight of Omya 1T (Omya Co.) as a filler, and 0.3 parts by weight of St-A (Isu Chemical Co.) as a lubricating agent were blended and mixed at 700 rpm at 98° C. By using a roll mill, working was conducted at 160° C. for 4 minutes, and by using a press, working was conducted at 180° C. for 3 minutes (low pressure) and for 2.5 minutes (high pressure) to manufacture a specimen.

With respect to the specimens, each of the test items were evaluated according to the measurement methods by set, and the results are shown in Table 3 and Table 4 below.

TABLE 3

|  | Hardness (Shore A) | Tensile strength (kgf/cm$^2$) | Tensile retention (%) | Elongation rate (%) | Elongation retention (%) | Migration loss (%) | Volatile loss (%) | Cold tolerance (° C.) |
|---|---|---|---|---|---|---|---|---|
| Example 1-1 | 91.2 | 171.0 | 104.5 | 314.8 | 92.7 | 1.23 | 1.44 | −27.5 |
| Example 1-2 | 91.7 | 172.5 | 103.4 | 310.5 | 93.0 | 1.02 | 0.90 | −28 |
| Example 1-3 | 92.0 | 172.3 | 102 | 308.7 | 93.4 | 0.64 | 0.78 | −28 |
| Example 1-4 | 92.3 | 173.2 | 101.2 | 306.9 | 94.3 | 0.30 | 0.67 | −28.5 |
| Example 1-5 | 92.8 | 176.4 | 98.7 | 305.2 | 96.7 | 0.21 | 0.40 | −32.5 |
| Example 1-6 | 92.1 | 175.8 | 101.7 | 306.1 | 96.5 | 0.73 | 0.72 | −28.5 |
| Example 1-7 | 92.7 | 182.6 | 99.8 | 302.4 | 98.7 | 0.70 | 0.34 | −30 |
| Example 1-8 | 91.6 | 176.8 | 100.3 | 303.2 | 95.5 | 0.58 | 0.45 | −30.5 |
| Example 1-9 | 93.4 | 188.9 | 98.4 | 302.7 | 99.7 | 0.34 | 0.30 | −34 |
| Example 1-10 | 91.8 | 175.0 | 102.5 | 305.8 | 93.7 | 1.00 | 0.92 | −29 |
| Example 1-11 | 92.4 | 174.6 | 100.6 | 305.4 | 94.5 | 0.35 | 0.70 | −29.5 |
| Comparative Example 1-1 | 92.7 | 170.6 | 93.4 | 297.5 | 92.1 | 1.54 | 0.88 | −28.5 |
| Comparative Example 1-2 | 93.2 | 169.7 | 91.5 | 278.6 | 88.4 | 1.74 | 1.24 | −27.5 |
| Comparative Example 1-3 | 90.7 | 168.0 | 106.7 | 314.2 | 86.3 | 2.03 | 2.11 | −26 |
| Comparative Example 1-4 | 97.8 | 183.0 | 97.8 | 288.6 | 98.7 | 0.30 | 0.28 | −34 |
| Comparative Example 1-5 | 93.0 | 172.3 | 96.4 | 298.2 | 95.6 | 2.30 | 0.95 | −28 |
| Comparative Example 1-6 | 93.6 | 170.5 | 88.6 | 301.4 | 87.4 | 1.86 | 1.92 | −30.5 |
| Comparative Example 1-7 | 93.9 | 164.0 | 92.3 | 286.4 | 93.8 | 1.67 | 1.68 | −22.5 |
| Comparative Example 1-8 | 90.3 | 154.0 | 72.0 | 286.9 | 65.7 | 4.58 | 8.77 | −29.5 |
| Comparative Example 1-9 | 90.8 | 170.1 | 79.8 | 288.2 | 81.3 | 1.78 | 2.54 | −30 |

Referring to Table 3, it was secured that Examples 1-1 to 1-11 showed improved physical properties when compared with Comparative Examples 1-1 to 1-9. Particularly, Comparative examples 1-1 and 1-2, which corresponded to conventional phthalate-based products, showed inferior elongation rate, elongation retention, and tensile retention, when compared with the Examples and Comparative Example 1-3, which used only a hydrogenated product, showed serious degree of physical property deterioration in poor surroundings (elongation retention and cold tolerance) and poor migration loss and volatile loss by about 500 or more.

In addition, Comparative Example 1-4, which used only a trimellitate-based product, showed significant disadvantage for plasticization efficiency and low elongation rate, and it was secured to be inappropriate as a material for imparting plasticization effect. Comparative Example 1-5, in which a terephthalate-based material and a trimellitate-based material were mixed, showed markedly inferior physical properties when compared with the Examples in which a hydrogenated terephthalate-based material was used, and particularly, migration properties and tensile retention were markedly deteriorated.

Also, Comparative Example 1-8, in which the cyclohexane 1,4-diester did not satisfy the carbon number, and Comparative Example 1-9, in which the trimellitate-based material did not satisfy the carbon number, were secured to show rapid deterioration of most physical properties including migration loss, volatile loss, tensile and elongation retention, and elongation rate.

If acetyl citrate or epoxidized oil other than a trimellitate-based material was used as the mixture plasticizer of the cyclohexane 1,4-diester (Comparative Example 1-6 and Comparative Example 1-7), improving effects were not marked when compared with a case using the trimellitate-based material. Particularly, a case of using the epoxidized oil, the improvement of cold tolerance, tensile strength and elongation rate was impossible, and a case of using the acetyl citrate, large improving effect of tensile and elongation retention, migration properties and volatile loss was not shown.

TABLE 4

|  | Hardness (Shore A) | Tensile strength (kgf/cm$^2$) | Tensile retention (%) | Elongation rate (%) | Elongation retention (%) | Migration loss (%) | Volatile loss (%) | Cold tolerance (%) |
|---|---|---|---|---|---|---|---|---|
| Example 2-1 | 91 | 173.5 | 98.6 | 297.6 | 94.8 | 0.2 | 0.3 | −26.5 |
| Example 2-2 | 91.8 | 179.6 | 95.8 | 306.6 | 98.7 | 0.27 | 0.45 | −29 |
| Example 2-3 | 92 | 185.4 | 96.7 | 310.4 | 96.7 | 0.58 | 0.98 | −29.5 |
| Example 2-4 | 92.1 | 190.4 | 98.4 | 312 | 99.1 | 0.2 | 0.31 | −27 |
| Example 2-5 | 91.5 | 184.2 | 92.4 | 311.7 | 94.2 | 0.98 | 1.02 | −30.5 |
| Example 2-6 | 91.2 | 188.4 | 95.6 | 308.6 | 96.5 | 0.44 | 0.68 | −29 |
| Example 2-7 | 91.6 | 184.6 | 96.8 | 302.7 | 93.4 | 0.35 | 0.41 | −31 |

TABLE 4-continued

| | Hardness (Shore A) | Tensile strength (kgf/cm²) | Tensile retention (%) | Elongation rate (%) | Elongation retention (%) | Migration loss (%) | Volatile loss (%) | Cold tolerance (%) |
|---|---|---|---|---|---|---|---|---|
| Comparative Example 2-1 | 92.7 | 170.6 | 93.4 | 297.5 | 92.1 | 1.54 | 0.88 | −28.5 |
| Comparative Example 2-2 | 93.2 | 169.7 | 91.5 | 278.6 | 88.4 | 1.74 | 1.24 | −27.5 |
| Comparative Example 2-3 | 95 | 170.3 | 99.7 | 288.7 | 95.1 | 0.34 | 0.31 | −23.5 |

Referring to Table 4, excellent effects were secured for cases where epoxidized oil was additionally added in case of mixing a cyclohexane 1,4-diester-based material and a trimellitate-based material for using as a plasticizer, and it was secured that if a cyclohexane 1,4-diester-based material was used as a plasticizer, epoxidized oil was required to be mixed as a third material.

Particularly, in case where only a trimellitate-based material and epoxidized oil were used and a cyclohexane 1,4-diester-based material was not used (Comparative Example 2-3) the improvement of cold tolerance was impossible and the elongation rate fell short of expectations.

That is, it may be found that if a cyclohexane 1,4-diester-based material is utilized, a trimellitate-based material may be the most appropriate material as a mixing partner. Further, if epoxidized oil is additionally added, the improvement of physical properties may be achieved. Though various materials are mixed, if another material is injected to a plasticizer component, the amount of an original plasticizer material may be relatively decreased. Accordingly, considering that the change of physical properties according to the injection of another material does not mean natural "improvement", the effect improvement due to the selective mixing of the above-described plasticizer composition may be considerably significant.

The invention claimed is:

1. A plasticizer composition comprising a cyclohexane 1,4-diester-based material comprising one or more cyclohexane 1,4-diesters, wherein each of two alkyl groups combined with two ester groups of the one or more cyclohexane 1,4-diester has a carbon number of 8 to 12; and a trimellitate-based material comprising a compound represented by the following Formula 1:

[Formula 1]

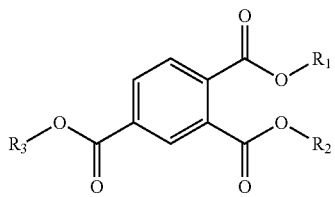

wherein in Formula 1, $R_1$ to $R_3$ are each independently an alkyl group of 8 to 12 carbon atoms, and wherein a weight ratio of the cyclohexane 1,4-diester-based material to the trimellitate-based material is 90:10 to 10:90, the plasticizer composition further comprises two additional 1,4-diester cyclohexanes, each of which are different from the cyclohexane 1,4-diester having each of two alkyl groups having a carbon number of 8 to 12 combined with two ester groups, the plasticizer composition comprises 3.0 to 99.0 mol % of the cyclohexane 1,4-diester having each of two alkyl groups having a carbon number of 8 to 12 combined with two ester groups, and the plasticizer composition comprises 0.5 to 96.5 mol % of each of the two additional 1,4-diester cyclohexanes.

2. The plasticizer composition according to claim 1, wherein a weight ratio of the cyclohexane 1,4-diester-based material and the trimellitate-based material is 80:20 to 10:90.

3. The plasticizer composition according to claim 1, wherein the two alkyl groups combined with the two ester groups of the one or more cyclohexane 1,4-diesters of the cyclohexane 1,4-diester-based material are each independently selected from the group consisting of a 2-ethylhexyl group, an isononyl group and a 2-propylheptyl group.

4. The plasticizer composition according to claim 1, wherein $R_1$ to $R_3$ of Formula 1 are each independently selected from the group consisting of a 2-ethylhexyl group, an isononyl group and a 2-propylheptyl group.

5. The plasticizer composition according to claim 1, wherein the plasticizer composition further comprises an epoxidized oil as a secondary plasticizer.

6. The plasticizer composition according to claim 5, wherein a weight ratio of a mixture of the cyclohexane 1,4-diester-based material and the trimellitate-based material with respect to the epoxidized oil is 90:10 to 50:50.

7. The plasticizer composition according to claim 5, wherein the epoxidized oil comprises one or more selected from the group consisting of epoxidized soybean oil, epoxidized castor oil, epoxidized linseed oil, epoxidized palm oil, epoxidized stearate, epoxidized oleate, epoxidized tall oil and epoxidized linoleate.

8. A resin composition comprising: 100 parts by weight of a resin; and 5 to 150 parts by weight of the plasticizer composition of claim 1.

9. The resin composition according to claim 8, wherein the resin is one or more selected from the group consisting of ethylene vinyl acetate, polyethylene, polypropylene, polyketone, polyvinyl chloride, polystyrene, polyurethane and thermoplastic elastomer.

10. The plasticizer composition according to claim 1, wherein the two alkyl groups combined with the two ester groups of the one or more cyclohexane 1,4-diesters of the cyclohexane 1,4-diester-based material is a 2-ethylhexyl group.

11. The plasticizer composition according to claim 1, wherein the two alkyl groups combined with the two ester groups of the one or more cyclohexane 1,4-diesters of the cyclohexane 1,4-diester-based material is an isononyl group.

12. The plasticizer composition according to claim 1, wherein the two alkyl groups combined with the two ester groups of the one or more cyclohexane 1,4-diesters of the cyclohexane 1,4-diester-based material is a 2-propylheptyl group.

13. The plasticizer composition according to claim 1, wherein $R_1$ to $R_3$ of Formula 1 are a 2-ethylhexyl group.

14. The plasticizer composition according to claim 1, wherein $R_1$ to $R_3$ of Formula 1 are an isononyl group.

15. The plasticizer composition according to claim 1, wherein $R_1$ to $R_3$ of Formula 1 are a 2-propylheptyl group.

16. The plasticizer composition according to claim 1, wherein each of the two alkyl groups combined with two ester groups of the one or more cyclohexane 1,4-diester has a carbon number of 8 to 11.

17. The plasticizer composition according to claim 1, wherein each of the two alkyl groups combined with two ester groups of the one or more cyclohexane 1,4-diester has a carbon number of 8 to 10.

* * * * *